United States Patent [19]
Stuffle et al.

[11] Patent Number: 6,067,480
[45] Date of Patent: May 23, 2000

[54] METHOD AND APPARATUS FOR IN-SITU FORMATION OF THREE-DIMENSIONAL SOLID OBJECTS BY EXTRUSION OF POLYMERIC MATERIALS

[75] Inventors: Kevin L. Stuffle; Peter J. Creegan; John L. Lombardi; Paul D. Calvert; John A. O'Kelly; Robert A. Hoffman; Gabriel C. Chambers, all of Tucson, Ariz.

[73] Assignee: Stratasys, Inc., Eden Prairie, Minn.

[21] Appl. No.: 08/825,893

[22] Filed: Apr. 2, 1997

[51] Int. Cl.$^7$ ........................................ G06F 15/46
[52] U.S. Cl. .......................... 700/109; 700/118; 700/119; 700/196; 264/168; 264/288.4; 239/133; 239/135; 239/227
[58] Field of Search ................. 364/468.26, 468.25, 364/468.24; 700/109, 196; 264/168, 288.4; 239/133, 135, 227

[56] References Cited

U.S. PATENT DOCUMENTS

| | | | |
|---|---|---|---|
| Re. 35,334 | 9/1996 | Moore et al. | 264/489 |
| 4,078,599 | 3/1978 | Makiguchi et al. | 164/41 |
| 4,325,913 | 4/1982 | Wissbrun et al. | 264/176 |
| 5,013,514 | 5/1991 | Azzani et al. | 264/512 |
| 5,121,329 | 6/1992 | Crump | 364/468 |
| 5,158,130 | 10/1992 | Sahari | 164/528 |
| 5,340,433 | 8/1994 | Crump | 156/578 |
| 5,649,277 | 7/1997 | Gruel et al. | 419/2 |

FOREIGN PATENT DOCUMENTS

WO 95/26864  12/1995  WIPO .

OTHER PUBLICATIONS

T. L. Wei, Y. H. Huang and J. T. Hu, "Computer Simulation in the Injection Moulding of a Thermoplastic Fuel Rail by the Lost–Core Technique," *Composite Polymers*, vol. 5, No. 4, pp. 257–269 (1992).

H. Keskkula and D. R. Paul, "Miscibility of Polyethyloxazoline with Thermoplastic Polymers," *Journal of Applied Polymer Science*, vol. 31, pp. 1189–1197 (1986).

J.–L. G. Pfenning, H. Keskkula, and D. R. Paul, "Water Extraction of Polyethyloxazoline from Miscible and Immiscible Polymer Blends," *Journal of Applied Polymer Science* vol. 32, pp. 3657–3673 (1986).

Marcus, Harris L., et al., "Solid Freeforms Fabrication Finds New Application," *Advanced Materials & Processes*, pp. 28–35 (Sep. 1993) vol. 144, No. 3.

P. Järvelä, A. Jaala–Siuko, and H. Hylhä, "Greencast–Process, A New Ceramic Technology for Plastics Processing," *Advanced Performance Materials* vol. 3, pp. 171–182 (1996).

*Primary Examiner*—Albert De Cady
*Assistant Examiner*—Esaw Abraham
*Attorney, Agent, or Firm*—Kinney & Lange, P.A.

[57] ABSTRACT

An apparatus for thermal extrusion of a polymeric material to manufacture prototype mechanical elements from said polymeric material, said apparatus used for deposition of a liquefied ribbon of said polymeric material in patterned layers which solidify to form a three-dimensional prototype element, said apparatus comprising in combination, a mounting frame, said mounting frame including a mounting plate with a movable platen movable in the x and y directions, said frame further including an extrusion cylinder, said extrusion cylinder comprising a cylindrical housing having a uniform diameter cylindrical through passage, a head member having a uniform diameter bore connected with a reduced diameter, integral tip opening, said head member attached by a clamp to one end of the cylindrical housing to align the bore with the through passage, said-bore and through passage having an equal diameter, said head member including a circumferential heater to liquefy contents of the head member, a reciprocal piston slidably positioned in the cylindrical housing, and a piston actuator for driving the piston into the through passage to eject material through the tip opening.

5 Claims, 2 Drawing Sheets

METHOD AND APPARATUS FOR IN-SITU FORMATION OF THREE-DIMENSIONAL SOLID OBJECTS BY EXTRUSION OF POLYMERIC MATERIALS

BACKGROUND OF THE INVENTION

This invention relates to an apparatus for the preparation of three-dimensional prototypes or models. Prototypes of parts are made and used in testing in a wide-variety of industries, such as the automobile, airline, and biomedical prosthetic industries. After successful testing the prototypes of the parts, a mold of the prototype can be made and the part can be manufactured on a mass production basis.

There are three ways of making prototypes. One method involves simply making a mold of the part, making the prototype, and then testing the prototype. However, this method requires the cost of making a mold, which itself can be extremely expensive and time-consuming. Moreover, this method may require numerous molds to be made on a trial and error basis until a successful art has been designed that sufficiently passes the required testing.

A second method of making prototypes involves sculpting a three-dimensional prototype of a particular shape from a block work piece. In this method, the prototype is drawn either manually or using computer-aided design (CAD) techniques, and the prototype is formed by removing material from a block work piece. The part can be further machined either manually or using computer-aided machining (CAM) techniques. However, this method can also be a costly and time-consuming process because it may require repeated iterations until a desired prototype is made.

A third method that has been developed involves the formation of a three-dimensional prototype by depositing multiple layers of a material in a fluid state onto a base. The fluid solidifies to define the prototype element. For example, such a method is taught in U.S. Pat. No. 5,340,433, and U.S. Pat. No. 5,121,329, both issued to S. Scott Crump and assigned to Stratasys, Inc. incorporated herewith by reference. In this method, a layer of the fluid material solidifies and then another layer of fluid material is deposited over the preceding layer. The thickness of each layer is controlled by the distance between the tip of the dispensing head and the preceding layer. However, there are a number of disadvantages to the method and apparatus taught in this third method because only certain types of materials can be suitably used to make the prototypes, such as waxes having low melt viscosity and strength. Cross linking materials may be used to try to improve strength and toughness. In any event, this prior art deposition method may not produce durable prototypes made from high performance engineering polymers and composites.

There is a clear need for a method and apparatus that can make stronger and tougher prototypes made of engineering polymers and composites having high melt viscosity and long chain lengths.

SUMMARY OF THE INVENTION

The present invention overcomes the disadvantages of prior deposition methods and apparatus. In the present invention, unique extrusion heads are used to make stronger and more durable prototypes. These new extrusion heads use a direct drive motor and ball screw to develop high force and accurate positive displacement of a piston into a polymer extrusion cylinder. Feed rods of the polymer are thus extruded from an extrusion cylinder head using a piston, which is displaced into the cylinder.

The present invention provides a heated, high pressure extruder head techniques for making three-dimensional objects made of engineering polymers and composites, curing methods, and specific examples of how the present invention can be used to make biomedical prothesis, aerospace and other prototypes. Thus, the present invention provides substantial improvements over conventional deposition methods and apparatuses, and provides for the fabrication of three-dimensional objects made of high strength and tough engineering polymers and composites.

The strength and toughness of the prototypes made using the present invention over that of the prior deposition techniques can be attributed in part to the differences in chemical structure, namely polymer chain length, and degree of cross linking of the materials used to make the prototypes. Engineering polymers and composites used in the present invention are composed of assemblages of linear, high molecular weight polymer chains that result in a tough thermoplastic prototype. In fact, the prototypes made in accordance with the present invention are more than 50% stronger, tougher, and thermally stable relative to prototypes made using the prior deposition method. The reason that prototypes made of engineering polymers and composites are not successfully fabricated in prior deposition methods and apparatus is that long chain length polymers having high viscosity cannot be suitably used in the prior deposition apparatus.

In the present invention, materials for high pressure fused deposition include polyaryletherketone (PEEK®) produced by Victrex), polmethylmethacrylate (PMMA®) produced by DuPont), polycarbonate (Lexan®) made by General Electric Plastics), thermoplastic polyurethane (Pellethane®) made by Dow Chemical), and polylatic acid/polyglycolic acid block copolymer (a bio-absorbable material made by a Biomet joint venture). Fused deposition of fiber reinforced grades of engineering polymers and composites, for example PEEK® and Lexan®, can also be used in the present invention. Moreover, prototypes can be made in accordance with the present invention using fiber reinforcement. For example, carbon fiber reinforced PEEK® materials had a tensile strength of over 36000 psi, exhibited a very high fracture toughness and demonstrated highly anisotropic mechanical properties whereas unreinforced materials did not.

It is thus an object of the invention to provide a high pressure extrusion apparatus and method for in-situ formation of durable three-dimensional prototypes made of engineering materials that could not be previously used in prior art apparatus and methods.

These and other objects, advantages and features of the invention will be set forth in the detailed description which follows.

BRIEF DESCRIPTION OF THE DRAWING

In the detailed description as follows, reference will be made to the drawings comprised of the following figures.

DETAILED DESCRIPTION OF THE PREFERRED EMBODIMENT

A. Materials

Figure 1:
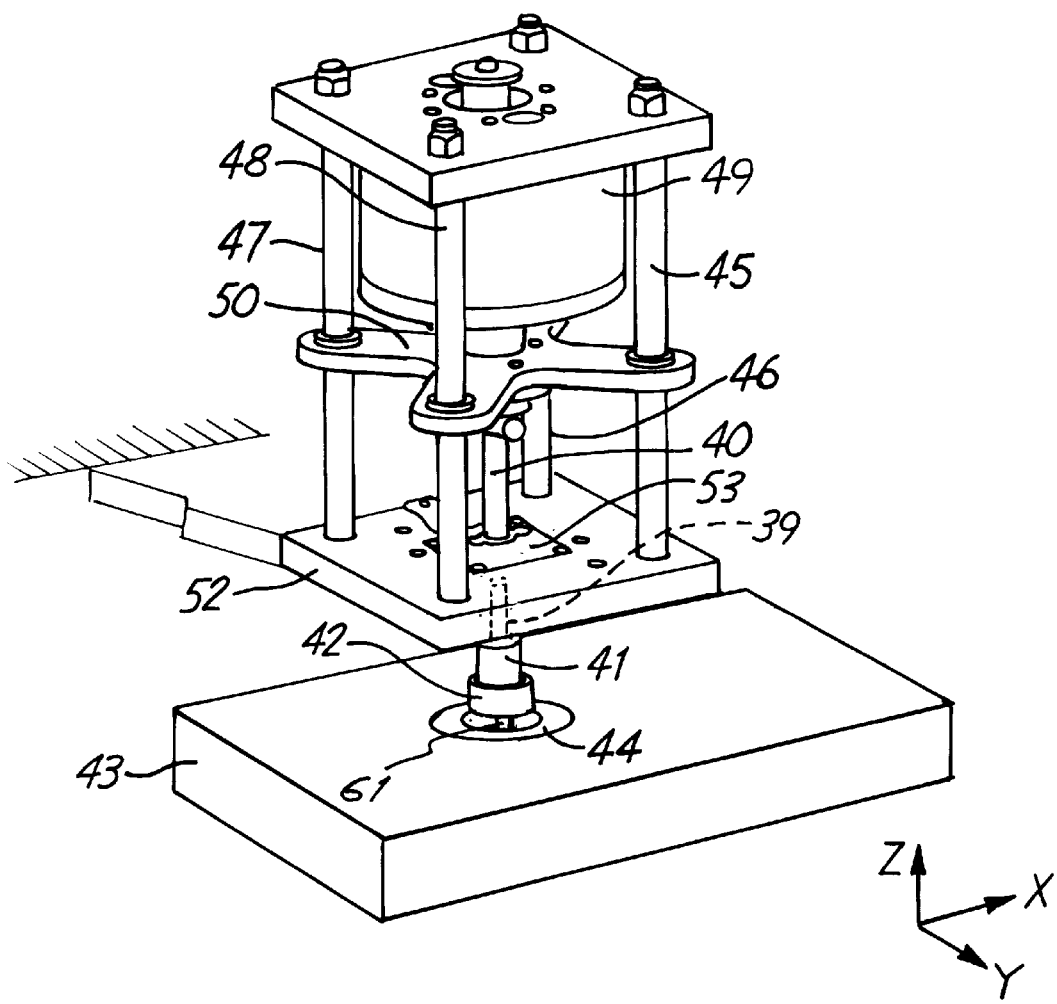
FIG. 1 is a schematic illustration of the extrusion press of the present invention.

In accordance with the present invention, a number of engineering polymers and composites were screened for suitability. Some of the materials were true thermoplastics and others were melt processing thermoset materials. Various materials screened are listed in Table 1.

TABLE I

Polymers Screened

| Trade Name | Manufacturer | Polymer | Reinforcement |
| --- | --- | --- | --- |
| IP-600 | National Starch | acetylene terminated | none |
| MC-600 | National Starch | acetylene terminated | none |
| PEEK 150 | Victrex USA Inc. | polyaryletherketone | none |
| PEEK 450G | Victrex USA Inc. | polyaryletherketone | none |
| PEEK 450CA30 | Victrex USA Inc. | polyaryletherketone | 30% carbon fiber |
| Pellethane 2363 | Dow Chemical | polyurethane | none |
| Torlon | GE Plastics | amide-imide | none |
| Lexan 141 | GE Plastics | polycarbonate | none |
| Lexan 3413 | GE Plastics | polycarbonate | 20% glass fiber |
| Elvacite 2009 | DuPont Co. | poly(methyl methacrylate) | none |

The apparatus and process of the present invention involves a first step of feed rod consolidation, and a second step of extrusion free forming. Consolidation is the pressing of feed rods that are subsequently used in the extrusion forming step.

In feed rod consolidation, materials are typically supplied in pellet form. The pellets are pressed in a single acting, heated cylindrical die and piston assembly at temperatures near the material's melting point under high pressure to produce a cylindrical feed rod that is without voids or flaws. The feed rod pressing conditions were determined interactively for each material at forty degrees less than the published melting temperature as a starting point.

The materials that appear most appropriate from Table 1 as a result of materials screening are listed below in Table 2. The optimized temperatures and pressures found for fabricating feed rods and the optimized deposition parameters are also included.

TABLE 2

Optimized Rod Pressing and Deposition Parameters

| Trade Name | Polymer | $T_R$ (° C.) | $P_R$ (psi) | $T_E$ (° C.) | $T_P$ (° C.) | $V_E$ (mm/s) |
| --- | --- | --- | --- | --- | --- | --- |
| PEEK450G | polyaryletherketone | 345 | 600 | 400 | 320 | 0.4 |
| PEEK450CA30 | polyaryletherketone | 345 | 600 | 390 | 320 | 0.4 |
| Pellethane 2363 | polyurethane | 190 | 600 | 210 | 140 | 0.4 |
| Lexan 141 | polycarbonate | 185 | 600 | 240 | 168 | 0.4 |
| Lexan 3413 | polycarbonate-$C_r$ | 185 | 600 | 260 | 185 | 0.4 |
| Elvacite 2009 | poly(methyl methacrylate) | 120 | 600 | 185 | 146 | 0.4 |

$T_R$ Rod Pressing Temperature
$P_R$ Rod Pressing Pressure
$T_E$ Extrusion Tip Temperature
$T_P$ Deposition Tip Pressure
$P_E$ Deposition Tip Pressure
$V_E$ Tip Velocity The rod pressing cycle is based on 10 min hold at temperature and pressure. As discussed below, the deposition parameters ($T_E$, $T_P$, $P_E$, $V_E$) were defined with 0.023" diameter extrusion nozzle also described in detail below with regard to FIGS. 1 and 2.

B. Apparatus

The cylindrical rods, made in accord with the above step, are then extrusion formed into useful, three-dimensional mechanical elements in accord with the method and apparatus of the invention. That is, in general, the cylindrical rods are next extruded at high temperature and high pressure from a discharge nozzle as a thin ribbon of material onto a platform. The platform is programmed to move in three dimensions as the ribbon is discharged from the nozzle. Thus, as the platform moves under the nozzle, layer upon layer of the material is deposited to form the prototype element. The utilization of a special cylinder and nozzle construction in combination with heaters enables the use of materials that have structural integrity such as polycarbonates, acrylics, silicon nitrides and ABS to form the prototype elements. As a result, the prototype elements made by the process have physical characteristics similar to or the same as final commercial elements. Thus, testing of complex component parts under final manufacturing criteria or conditions with prototype elements is possible. As a result, various intermediate prototyping steps are avoided.

FIG. 1 depicts an embodiment of the device in partial schematic view. The device or apparatus of the invention is an improvement over prior art prototyping devices and the features described in FIG. 1 are incorporated in place of and in addition to features of prior art apparatus. Specifically, in prior art devices, the material used to make the three-dimensional model or element was typically a thermoplastic ribbon that was fed by rollers through a heated nozzle. It operated in the range of 120° C. and 50–60 psi thus limiting the materials which could be used to make prototyping elements. The subject matter of the invention operates at temperatures up to 410° C. and at pressures of 5 to 10 kpsi. Thus, the range of materials which may be used for prototyping is increased. However, all materials are not necessarily useful in the process, and the choice of materials also forms a part of the invention as discussed above and below.

Referring to FIG. 1, a cylindrical feed rod 39 of polymeric material is pushed by a piston 40 into a cylinder 41 with a heated head 42 and a discharge nozzle 61. A discharge ribbon of extruded material flows onto a moving, heated platform 43 to form a prototype or mechanical element 44. The extruder system is a four post 45, 46, 47, 48 screw press driven with a massive Dynaserv® servo motor 49. This motor 49 is capable of very powerful and precise movements. The Dynaserv motor drives 1.25" precision ground ball screw. The end of the screw is secured on a plate 50 which slides on the four posts 45–48. This plate 50 also prevents any axial misalignment of the screw and houses a load cell. The end of the screw is fitted with a cup for attaching the extrusion piston 40. The bottom plate 52 of the press has a keyhole shaped mounting insert 53 for the extrusion cylinder 41. A servomotor (not shown) for platform 43 is controlled by a four axis controller card in a personal computer. This platform system is depicted in general in U.S. Pat. No. 5,340,433 or U.S. Pat. No. 5,121,329.

Figure 2:
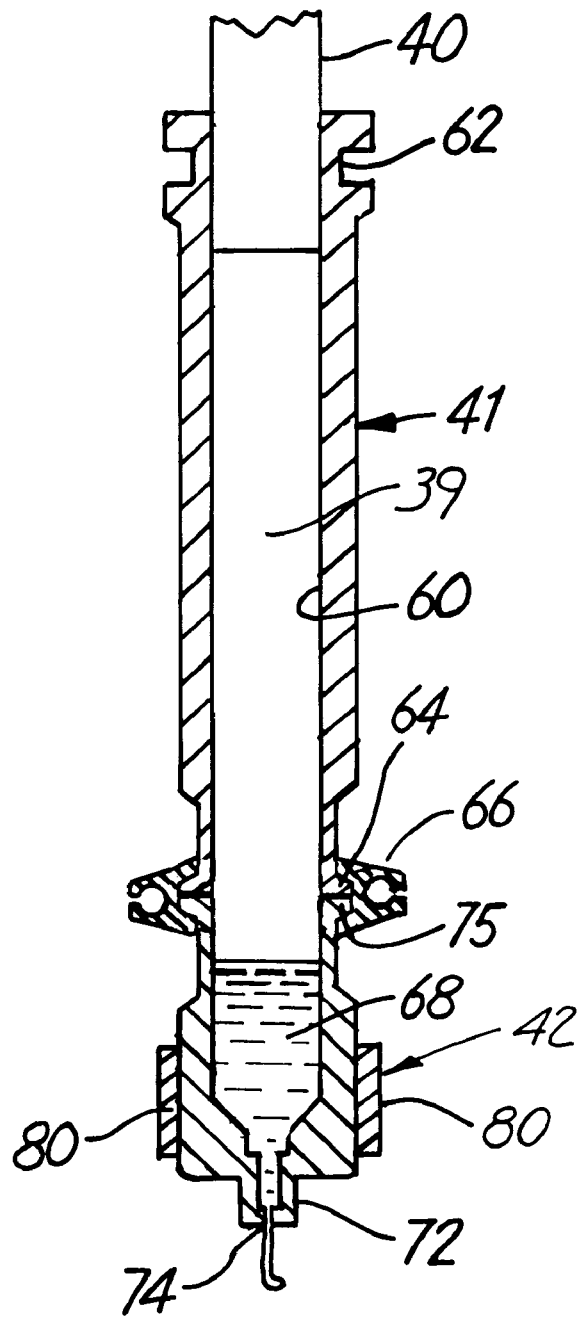
FIG. 2 is a cross sectional view of the cylinder and head for the batch extrusion component of the apparatus of the invention.

Referring next to FIG. 2, there is depicted the piston 40, cylinder 41 and head 42 which form an integral part of the invention. Specifically, the cylinder 41 has a smooth sided, longitudinal through passage 60 of uniform diameter. The top end of cylinder 41 includes a circumferential groove 62 to facilitate mounting in plate 52 (see FIG. 1). The bottom end of cylinder 41 includes a circumferential rib 64 which cooperates with a clamp 66. The head 42 includes a bore 68 with a diameter equal to that of through passage tip 72 and co-axial therewith. The bore 68 connects with a reduced diameter nozzle 60 having a discharge orifice 74. Orifice 74 is 0.024" diameter or less.

Head 42 has an upper rib 75 which coacts with clamp 66. Through passage 60 and bore 68 have has about a 0.75" diameter. Cylinder 41 has a longitudinal dimension of about 6 inches or more. Maintenance of a smooth surfaced through passage 60 and, 68 along the entire length is highly preferred. The through passage 60 and bore 68 should also be uniform in diameter. Also, the diameter of the polymer rod 39 should be approximately equal to the diameter of through passage 60 and, 68.

A circumferential heater band 80 surrounds the head 42. Head 42 has a uniform outside diameter and a generally thicker wall to define a heated mass so that polymer within the head 42 is liquefied in the process. That is, the polymer rod 39 in the through passage 60 is heated and softened and subjected to pressure while the polymer in the bore 68 is liquefied for extrusion.

In operation of the process, the polymer feed rod 39 should be maintained in solid form to the maximum extent possible in through passage 60. The process is also a batch process since it is limited by the volume of rod 39. Heating generally takes place only at the head 42 to avoid polymer breakdown. Nozzle tip 72 configuration can be changed to control ribbon discharge volume, width, etc. Importantly, the nozzel tip 72 should be an integral part of the head 42. Thus a three piece design (cylinder 41, head 42, clamp 66) is preferred.

The process works with engineering thermoplastics such as discussed herein, ceramics, structural thermoplastics including PEEK, polycarbonate, acrylic, ABS, silicon nitride, alumina and zirconia. Also, it is possible to mix binders, fibers and other materials with the process. Also in the practice of the invention, the platform 43 may be stationary in one or more directions and the head 42 may be moved in said direction. Such accommodations are within the skill of those in the art.

C. Testing of Materials

1. Thermid Resins

Various materials were tested using the apparatus and process of the invention, some of which were successful and some were not. For example, Thermid resins did not have a sharp melting point and reacted exothermically at temperatures below the melting point. Differential scanning calorimetry (DSC) was employed to examine the processing window. The sample was ramped to the melting point and held to determine the stability at the melting point.

Production of a feed rod was attempted at temperatures well below the melting point. Even at temperatures of 100 degrees Celsius, the sample began to cure and was very difficult to remove from the pressing chamber. With such a small processing window the feasibility of extruding melted resin from the system was deemed unacceptable. For these reasons the Thermid systems were not developed further.

2. Phenylethynyl Terminated Resin

A sample of phenylethynyl terminated resin was investigated. DSC testing of the resin was performed to determine the exact nature of the processing window. As was seen in the Thermid resins, a sharp peak occurs at the melting point as the sample begins to cure. As the Thermid experiments showed, the resin was determined to be unacceptable.

3. PEEK

PEEK (polyanyletherketone) is a high molecular weight polyamide that is a true thermoplastic that has excellent mechanical properties at elevated temperatures. PEEK was formulated to have relatively low melt viscosity for its molecular weight. Two different neat grades of PEEK (150P and 450G) were screened. The lower viscosity grade PEEK (150P), was too fluid at the melt and it was very difficult to control during deposition. The higher viscosity grade, PEEK (450G) formed well and was extruded with a reasonable viscosity.

Both formulations were supplied in pellet form and feed rod consolidation procedures were developed. The PEEK tended to degrade over time at high temperature, and the higher the temperature, the more quickly degradation occurred. With this in mind a consolidation path was chosen to soften the PEEK but not completely melt it, and press it at relatively high pressure to produce a uniform rod with no gaps or voids.

PEEK deposits very well on a stainless steel substrate as it bonds to stainless steel quite well, so well in fact that the pressing chamber and extrusion dies must be made of tool steel, a grade that PEEK will not stick to. Neat PEEK free formed quite readily. High quality prototype boxes were prepared. There was some tendency to warp, presumably due to shrinkage of the polymer.

PEEK-30 volume % short carbon filter (450CF) could be readily free formed. High-quality prototype matchbook-sized boxes, with good spatial resolution, were routinely produced using the invention process. The bead quality and spacing were such that the boxes were water-tight. The carbon fiber seemed to eliminate the warpage seen with the neat PEEK. A high degree of fiber alignment occurs during free forming.

4. Pellethane

Pellethane is a thermoplastic polyurethane that has seen use in the medical industry. Problems were encountered with the material. It was discovered that at elevated temperatures (above 200° C.) the Pellethane strands would become foam-like and opaque. Closer observation revealed that the foam took longer to form as the combination of temperature and length of time exposed to the temperature decreased. The literature on Pellethane dictates that the material will absorb water if exposed to the ambient atmosphere for any length of time greater than a few hours. Initially, samples were stored in sample bags with no thought as to the water uptake of the sample. Hypothesizing that the cause of the foam could be entrapped water which was caused to boil at the elevated temperatures, the samples were baked for 72 hours at 110° C. prior to extrusion. An immediate improvement was found at the length of time the sample could be held above 200° C. This was increased by approximately a factor of 10. Using the prebake step, the samples would not become foam-like. However, they would instead create easily seen bubbles if held at melting temperature too long. In an additional effort to increase the length of time the Pellethane sample could be kept in the extruder, the extruding temperature was lowered from 210° C. to 205° C. The melting temperature of Pellethane has been found to be a range from 210° C. to 230° C. The extruded samples, however, flow well, and with no bubbles present, at 205° C. Another factor, however, in preventing the sample from bubbling is to increase the extrusion rate (1 inch per second). Increasing the extrusion rate keeps the time the sample is exposed to the head of extruder (held at 205° C.) to a minimum.

The surface that the Pellethane is extruded onto is an important factor in obtaining good parts. The adhesion of the first layer to the hot plate controls how well the part turns out. If adhesion is poor, the first layer will not stick to the plate and successive layers will stick to the first layer. Thus, the sample will warp. This causes the sample to rub against the extrusion head which causes the sample to be destroyed.

In an effort to keep the surface characteristics (surface roughness, cleanliness, etc.) constant a disposable aluminum foil was placed over the plate and used as the deposition surface. The foil has proven to provide a surface that is quick to replace and provides repeatable results. Pellethane sticks to the clean aluminum foil almost too well. The shrinkage of the sample must be taken into account or the sample will tear itself to pieces once it cures. The temperature of the plate has also been found to be an important factor. If the plate is kept at less than 170° C., the individual strands of Pellethane will not stick to one another. At 180° C., the sample's lower levels will remelt, and bubbles will form in the sample. Therefore, the plate is held at 170° C. which provides enough residual heat that ensures that the strands stick to each other, yet does not cause the lower layers to form bubbles and remelt.

Overall Pellethane is a difficult material to work with. Its processing window is small and there is a tendency to slump at platen temperatures sufficient to cause good bonding. Parts can be produced with the material, but its shape forming capabilities are marginal.

5. Torlon

A sample of poly(amide-imide) was obtained from Amoco Chemicals, who market this under the trade name Torlon. Attempts to process poly(amide-imide) were not successful. The pressure required to produce a satisfactory bead at 350° C. was found to be 8600 psi which is considerably higher than that encountered with any other system. Due to these high pressure the polymer would swell (die swell), once out of the spinnerette, to more than twice its original size, and in addition, it tended to adhere very strongly to the steel, the platen, spinnerette, extruder wall, etc. However, the material would not adhere to itself, thus making the preliminary parts delaminate easily resulting in quite poor part quality. Due to these difficulties free forming poly(amide-imide) has deemed to be unsatisfactory.

6. Lexan

Lexan (Polycarbonate) and 30 volume % carbon fiber filled Lexan. The free forming processing parameters have been optimized at 250° C. and 2600 psi for this material. This material free formed very well.

7. Elvacite

Elvacite, polymethylmethacrylate, grade 2009 was evaluated in the free forming process. This material, like Lexan, free formed very easily. This material also has water sensitivity.

D. Design of Cylinder, Head, Piston

Following is a typical example of the design protocol for the cylinder, etc. of FIG. 2.

Minimize overall length (OAL)

Minimize weight

Maximize the stiffness of the system

Pressure vessel design of extrusion cylinders

1. Overall Length

This dimension is controlled by the length of the stroke of the piston into the extrusion cylinder. The height of the head is the total of the lengths (thickness) of the top plate, motor, ball screw, adaptor plate, ball nut flange, load cell, attachment cup, and extrusion cylinder with cap and insert. The extrusion cylinder is designed for 20 cc feed rod volume.

The height can be expressed as:

OAL=Fixed Distances+2*(Stroke)

Fixed Distance=(top plate+motor+adaptor plate+ballnut flange+loadcell+attachment cup+daylight+extrusion cylinder)=8.62 inches The daylight is the open distance between the piston and the extrusion cylinder when the piston is fully withdrawn. This is selected to be 0.12 inches.

The stroke is the length of the extrusion cylinder and the travel of the ball screw. This is two (2) inches.

OAL=12.75 inches

Stroke/Travel:

The stroke of the piston into the extrusion cylinder and the diameter of the cylinder control the OAL and the volume of the material used determine the pressure of the system.

2. Ball Screw Assembly:

The ball screw is a high precision ground screw with a zero deflection ball nut attached. The ball screw was sized for strength, life span, and precision. The screw was a 1" diameter SSP ball screw assembly made by Thompson-Saginaw. The pitch of the ball screw controlled the force transition from rotational to linear. The ball nut is 90% efficient. That is 90% of the rotational force is turned into linear force with the remaining 10% as rotational force. The ball screw pitch was selected at 5 threads per inch. This is a common pitch. The force generated by the system is controlled by the pitch of the ball screw. The diameter of the ball screw is excessive for force and strength requirements but is needed for a quarter million inch travel life. The motor generates six (6) ft-lbs of torque. Using the following equation: (Mechanic of Materials, 3rd Ed.)

$$F = T*2*Pi*P*e$$

where
T=torque
P=pitch
e=efficiency $$F = 6*2*Pi*5*0.90*(\text{ft-in conversion})$$

F=2036 lbf

A ball screw of 10 threads per inch on the ACR model to double the force to 4072 lbf. This value was used to design the other components.

3. Load Cell

The load cell was selected to monitor the forces used during the free-forming process and act as a safety overload. The load cell is attached to a digital meter to display the force and to interrupt the servo motor if the maximum load is exceeded. The selected load cell reads in both tension and compression to monitor extraction loads as well. The extraction forces can be as high as the compression forces during operation. The load cell has a total defection of less than 0.003 inches at full load, however, this is the most compliant component in the load train.

4. Attachment Cup and Bushings

The attachment cup connects the load cell to the piston. The attachment cup is also connected to the rods via a sliding plate and bushings. This is to assure alignment of the ball screw and prevent damage to the load cell due to excessive side loads. The cup attaches the extrusion piston to the force train using a female receptacle and a cross pin.

5. Tension Rod/Columns

The bottom plate has a key hole shape cut out of it to receive the extrusion cylinders. The rods connect the top plate and the bottom plates together and provide a surface for the sliding plates attachment. The rods were selected to be strong in tension to resist deflection of the extruder system. The deflection of the rods is governed by the following equation:

$$\text{deflection} = \delta = \frac{(P*L)}{(A*E)} \quad \text{(column deflection equation)}$$

P=force=4072 lbf
L=length of column=13 inches
A=cross sectional area of column $$A=4*(\pi(d)/4)$$

E Young's Modulus of column material
E steel=30,000,000 psi
E aluminum=10,000,000 psi Selecting the deflection to be <0.003 inch at full load, we solve the equation for the diameter of the rods $$D=\text{SQRT}(PL/\pi\delta E)$$

The diameter is calculated to be D=0.433 inches.

Steel and aluminum were calculated for weight reduction purposes, but the high Modulus of steel offsets it's higher density and it was the material chosen. Commercially available alloy steel shafting called Turned, Ground and Polished (TG&P) is expensive and fills the needs of a bushing carrier shaft and a strength column. TG&P comes in 0.500 in diameter which gives a total deflection of 0.0025 inches at full load. This is the size and material selected for the four posts of the press.

6. Extrusion Cylinder

The extrusion cylinders are designed using ASME pressure vessel guidelines. A safety factor of four (4) is used in stress calculations. The extrusion cylinder is made from stainless steel which has a low thermal conductivity for structural metals. The H-11 tool steel to hold the insert has a high thermal conductivity and retains almost all of its yield strength at elevated temperatures (138 ksi at 900° F.). There is a band heater mounted on the cap to melt the end of the feed rod for the reduction cone of the insert. The angle of the cone is 90 degrees. This angle gives good results as we found out in our experiments. The internal diameter of the extrusion cylinder is one (1) inch. The stroke of the cylinder is two (2) inches. This is a volume of 1.57 cubic inches or @25 cc. The pressure exerted by the system is a factor of the I.D. of the cylinder and the force generated by the system. The cylinder is also at a maximum temperature of 380° C. (720° F.).

The equation for the pressure in the cylinder is:
Pressure=Force/Area
Force=4072 lbf
Area=[Pi*($d^2$)]/4 sq in
P=4072/[Pi ($1^2$)/4]=5185 psi The circumferential or "Hoop Stress" is the highest stress in a pressure cylinder. This stress is calculated using the following relation:

$$\text{Stress}=\sigma=(P*D)/(2*t)$$

P=pressure=5185 psi
D=outside diameter=1.50 inch
t=wall thickness=0.25 inch
σ=15,555 psi Using a 316 Stainless Steel with a yield strength of 65 ksi at 800° F. (Metals Handbook, Properties of SST at Elevated Temperatures, pg. 504, 8th edition) and the ASTM safety factor of four (4) the equation is:

Max Stress<Yield Strength/Factor of Safety 15,555<65,000/4

15,555<16,250 So this is a safe design.

To double check we used ASTM guidelines. The minimum wall thickness equation from Chemical Engineer's Handbook, 6th edition, eq. 6–37 is: minimum wall thickness=$_{min}$={(P*D)/(2[SE+P*Y]}+C P=pressure=5185 psi
D=outside diameter=1.5 inch
SE=Allowable stress (Table 6–37, Chemical Eng. Handbook) at operating temperature. Equal to 15.9 ksi
Y=coefficient (equal to 0.4 for Stainless Steels)
C=allowances for threads and corrosion (=0)
$t_{min}$=0.216 inches A wall thickness of 0.25 inches satisfies both methods of design calculation.

The design of the attachment between the extrusion cylinder and head was complicated by having to insert the cylinder through the hole in the slide. A "T" slot was designed for easy removal of the extrusion cylinder. The "T" inserts up through the Asymtec slide and the bottom plate of the extrusion head and then rotate 90 degrees and locks in place.

E. Mechanical Testing

Mechanical tests were carried out on three polymer resins manufactured into test configurations in accord with the invention. The tests included tensile, compression, and fracture toughness. The polymers were poly (methyl methacrylate) (PMMA), polycarbonate (PC) and polyaryletherketone (PEEK). In addition, two reinforced resins were used. These were PC containing 30% glass fiber, and PEEK containing 30% carbon fiber. Because there were a number of difficulties associated with the free forming of neat PEEK resin, it was decided that after tensile testing was completed, this polymer would be withheld from further tests. In addition to mechanical testing, sample densities were measured for comparison with literature values. The densities were measured using Archimedes method.

1. Tensile Testing

Tensile tests were performed as close to standard ASTM D638 as possible. Tensile bars were free formed and tested without further machining or modification. The test specimen geometry was of the typical "dog bone" shape. Machining the bars resulted in damage to the gauge section of some materials. Since tensile testing is very sensitive to notches, machining was not possible.

Two types of specimen orientations were tested. Type "V" samples were tested along the writing direction, while type "H" samples were tested across the writing direction. V and H refer to vertical and horizontal. This simply denotes the bead direction with respect to the mechanical testing equipment. The equipment used was a model 1011 Instron apparatus with a load cell capacity of 1000 pounds. The 1011 uses vertical specimen loading and wedge-action type grips. The cross head speed for all specimens was 0.2 inches per minute.

Tensile moduli, strength, 0.2% yield strength, and elongation or strain to fracture were calculated.

2. Compression Testing

Compression tests were performed as close to standard ASTM D695 as possible. Compression specimens were free formed and tested. Most specimens were tested without further modification, however, selected groups of samples were machined to tighter tolerances (~0.001 to 0.005") before being tested. The sample geometry used was a simple right cylinder. There were two basic sizes of specimens. The first was approximately one inch in length and one half inch in diameter. The second size was approximately one half inch in length and one quarter inch in diameter. All samples of the smaller size were machined on a mechanical lathe.

Two programs were used to freeform the larger specimens. The first program (A) constructs a cylinder which consists of identical stacked layers. Each layer is formed by first writing an inward spiraling bead until the center is reached. At that point, the extrusion nozzle writes a bead in a straight line directly to the outside of the layer. The z axis then decreases and the next layer is written. The layer is repeated until the cylinder is complete. The second program (B) makes a cylinder which consists of two alternating layers. The first nozzle is the same as the layer in the first program with one exception. When the nozzle finishes spiraling in, the z axis decreases and the next layer begins. That layer consists of an outward spiral. Once the outward spiral is written, the z axis again decreases and the pattern repeats itself until the cylinder is complete.

The smaller PEEK (30% carbon filter) samples were made with one program. That program is similar to the second program, above. The only difference is in the layer diameter.

In addition to freeformed materials, three molded samples were tested. Two samples of PEEK with 30% carbon fiber, and one sample of PMMA were machined from compression molded cylindrical rods. All three molded samples were of the smaller size.

Two testing machines were used. The first was an Instron with a 10,000 pound load cell. The second was an MTS hydraulic testing apparatus with a 3,000 pound load cell. The latter was used in preference to the former because it stored data digitally. In both cases, the strain rate was 0.05 inches per minute.

Compressive moduli, strength, and 0.2% yield strength were calculated.

3. Fracture Toughness Testing

Fracture toughness testing was performed as per ASTM D5045. Specimens of the compact tension type were used. The specimens were freeformed near net shape. The final geometry was achieved through machining. All specimens were machined to the same dimensions. In the case of this study W was one inch, and B was approximately one half inch. The holes were drilled to one quarter of an inch. "a" is the length of the precrack. It is measured from the center of the hole to perpendicular to the tip of the precrack. The notch was made with a low speed saw. Precracking for all samples except for PEEK was performed by inserting a razor blade into the notch and hammering the blade evenly. The blow caused a small crack to propagate. PEEK samples were resistant to this method and therefore had to be precracked with the testing equipment.

The following tables contain the results of the mechanical testing.

TABLE III

Tensile Test Results

| Material | Type | # | E (psi) Mean | St Dev | Manf. | $\sigma_{ultimate}$ (psi) Mean | St Dev | Manf. | $\sigma_{2\% \, yield}$ (psi) Mean | St Dev | Manf. | Elongation To Break (%) Mean | Manf. |
|---|---|---|---|---|---|---|---|---|---|---|---|---|---|
| PMMA | V | 5 | 189800 | 10426 | 475000 | 3334 | 337 | 6000 | NA | NA | 8000 | 1388 | 18 |
| PC | V | 7 | 153857 | 5242 | 340000 | 9846 | 392 | 10100 | 7292 | 225 | 9000 | 8682 | 130 |
| PC | H | 6 | 147333 | 4412 | 340000 | 6750 | 578 | 10100 | 5121 | 498 | 9000 | 5642 | 130 |
| PC (30% GF) | V | 8 | 405429 | 21740 | 1000000 | 16178 | 2674 | 19000 | 13763 | 2930 | ~ | 3778 | 30 |
| PC (30% GF) | H | 4 | 209750 | 20662 | 1000000 | 8459 | 1697 | 19000 | 7169 | 916 | ~ | 5771 | 30 |
| PEEK | V | 3 | 234333 | 18903 | 520000 | 8503 | 1418 | 14500 | NA | NA | 17000 | 3335 | 50 |
| PEEK | H | 3 | 253000 | 29445 | 520000 | 11754 | 2847 | 14500 | 8750 | ~ | 17000 | 5323 | 50 |
| PEEK (30% CF) | V | 2 | 1195500 | 226981 | 1900000 | 36374 | ~ | 34000 | 36000 | ~ | ~ | 2990 | 15 |
| PEEK (30% CF) | H | 3 | 513667 | 14742 | 1900000 | 18120 | 3069 | 34000 | 17800 | ~ | ~ | 357 | 15 |

GF = Glass fiber
CF = Carbon fiber
V = Testing is performed along the writing direction
H = Testing is performed across the writing direction
# = The number of samples used to determine reported values
Manf = Manufacturer's specification

TABLE IV

Compression Test Results

| Material | # | E (psi) Mean | St Dev | Manf. | $\sigma_{ultimate}$ (psi) Mean | St Dev | Manf. | $\sigma_{2\% \, yield}$ (psi) Mean | St Dev | Manf. |
|---|---|---|---|---|---|---|---|---|---|---|
| PMMA | 7 | 265000 | 59000 | 400000 | 10300 | 560 | 11000 | 8100 | 750 | NA |
| PC | 12 | 149000 | 32000 | 345000 | ~ | ~ | 12500 | 4000 | 570 | 9000 |
| PC (30% GF) | 4 | 211000 | 4000 | 1130000 | ~ | ~ | 18000 | 4600 | 330 | NA |
| PEEK (30% CF) | 9 | 411000 | 34000 | NA | 27600 | 1630 | 35000 | 13300 | 780 | NA |

TABLE V

Fracture Toughness Test Results

| Material | Geometry | # Samples | K1c (MPa·m½) Mean | St Dev | G1c (kJ/m²) Mean | St Dev |
|---|---|---|---|---|---|---|
| PMMA | A | 5 | 0.833 | 0.077 | 0.179 | 0.035 |
| PMMA | B | 5 | 0.860 | 0.175 | 0.169 | 0.061 |
| PC | A | 6 | 2.832 | 0.332 | 2.283 | 0.567 |
| PC | B | 5 | 2.540 | 0.230 | 1.765 | 0.430 |
| PC (30% GF) | A | 6 | 4.826 | 0.091 | 4.176 | 0.350 |
| PC (30% GF) | B | 5 | 2.558 | 0.341 | 1.240 | 0.252 |
| PEEK (30% CF) | A | 5 | 8.240 | 1.854 | 6.366 | 2.649 |
| PEEK (30% CF) | B | 5 | 5.509 | 0.362 | 2.624 | 0.315 |

A = Fracture propagates across the writing direction
B = Fracture propagates along the writing direction

TABLE VI

| Material | ρ(Manf) g/cc | ρ(Tensile) g/cc | ρ(Compression) g/cc | ρ(FT) g/cc |
|---|---|---|---|---|
| PMMA | 1.188 | 1.170 | 1.170 | 1.143 |
| PC | 1.20 | 1.11 | 1.087 | 1.161 |
| PC 30% GF | 1.43 | 1.195 | 1.268 | 1.319 |
| PEEK | 1.32 | ~ | ~ | ~ |
| PEEK 30% CF | 1.49 | 1.345 | 1.290 (As) 1.342 (A and B) | 1.344 |

F. Discussion of Results

The values contained in Tables III, IV and V resulted from averaging the test samples' measured properties of interest.

1. Tensile Testing

The tensile moduli of the unfilled polymers are all low when compared to values expected for conventionally formed glassy polymers, which typically have moduli of around 400,000 psi. Low moduli may be a result of the presence of lubricants and degradation products from the compression molding and extrusion steps. In addition, the densities of the tensile specimens were somewhat low with the exception of PMMA.

The moduli of the fiber reinforced polymers are greatly influenced by the writing direction. This is believed to be due to the fiber orientation parallel to the writing direction. This is believed to be due to fiber orientation parallel to the writing direction. The tensile properties suggest that fiber orientation follows the writing direction.

Elongation to break is very sensitive to surface finish in the notch-brittle engineering thermoplastics. Hence, the low elongation values are not surprising for these unpolished samples. Though breaking strengths would also be expected to be sensitive to surface or internal flaws, the measured values are generally in agreement with published data.

2. Compression Testing

It appears that there are no easily measurable differences in the mechanical properties of type A and B samples. The only difference noted was that type A samples of most of the materials cracked at the vertical plane created by the lines going out of the center of each of the layers. The lines create a vertical interface on one half of the cylinder. Because there is excess material at this plane, the strain within the plane is greater than in the rest of the part. The reason program A was used at all was that it produced parts with good geometry. Early on program A produced parts superior to program B because it eliminated one particular. The problem occurred when writing the centers of layers which were spiraling out from the center. Instead of writing well defined lines or beads at the center, material just flowed into a ball. This caused an increase in height at the center of each layer and a decrease around it. The effect was compounded by each consecutive layer. The approach in program A affected the height as well but to a much lesser extent. By the time the part was completely built, only a small overall increase in height occurred. The problem with program B is eliminated through changes in acceleration and deceleration in the x y table and through a decrease in the proportional axis factor.

Because there was no discernible differences in sample types, the data for both types was combined and reported. The compressive moduli are low when compared to published data. Again, the reason may be attributed to degradation from processing. The densities are again low when compared to manufacturer's specifications. Compressive strengths are generally in good agreement with published data. Samples tested by the Instron equipment were disregarded in calculating the average data because the measured strengths in many cases exceeded the manufacturer's specifications. In the case of reinforced polycarbonate, only the type B samples were considered.

In the case of PMMA and PEEK (30% CF), molded specimens were made and tested.

Molded specimens had the following samples Ids: PMMA 10As, PEEK 10As, and PEEK 11As. Because the measured properties of these samples were similar to freeformed sample properties, one is led to believe that degradation of the material occurs during the formation of the compression molded feed rods.

3. Fracture Toughness Testing

The results of the fracture tests support the proposed fiber alignment. While the neat polymers show no significant differences in $K_{1c}$ and $G_{1c}$ values between orientations, the fiber reinforced resins do. Type A reinforced polycarbonate samples had $K_{1c}$ and $G_{1c}$ values approximately 2 and 3.5 times that of its type B counterparts. Type A reinforced PEEK samples had $K_{1c}$ and $G_{1c}$ values approximately 1.5 and 2 times that of type B samples.

In the case of reinforced polycarbonate, the samples which were tested along the writing direction is considerably lower, the cracks in almost all of the samples deflected toward the writing direction. Thus, the measured values are lower than the true values. Similar crack deflection was seen in one of the reinforced PEEK type A samples.

4. Density

All of the samples in this study were somewhat porous. They ranged from 84% to 99% dense. The reason for low sample density can be attributed to the nature of the free forming process. The packing of the extruded beads can be modeled after the packing of cylinders. Beads are laid down directly on top of one another rather than in a close packed arrangement. This leaves a somewhat large gap in the region between adjacent beads. The packing density of cylinders is about 79%. One can assume that samples with densities greater than 79% were produced by smearing. Smearing occurs if the extrusion nozzle is lower than the top of the extruding bead, if the bead deforms under gravity or because of surface tension. The result is that the material spreads under the nozzle. This is almost always the case in the first layer of any part. Smearing the first layer causes the part to adhere more strongly to the substrate which is important for obvious reasons.

In general, the materials are 90% dense. One would expect that the moduli of both tensile and compression specimens would drop proportionately. Because the moduli measured in this test are generally between 40% and 50% of the manufacturer's specifications, density is probably not the only explanation for these low values. However, it may be possible that the mechanism by which the pores affect the Modulus is complex and influences mechanical properties are greater than expected.

G. Conclusion

High pressure fused deposition of engineering polymers has demonstrated great success considering the maturity of the technique. The mechanical properties of the materials systems developed greatly surpass those of other free formed polymer materials. The delivery system is very versatile and can form a number of important materials systems including both engineering polymers and ceramics. The integration of the delivery system with the commercial systems is viable.

The mechanical properties of the materials prepared in this work are compared with other free formed polymer materials in Table VII. The carbon fiber reinforced PEEK is more than six times stronger and three times stiffer than any of the presently available polymer materials. These properties represent a substantial improvement in the art.

TABLE 3

Comparison of Materials Properties from Commercial SFF Systems

| System | Material | Grade | σ tensile (psi) | E tensile (ksi) | ε break (%) |
| --- | --- | --- | --- | --- | --- |
| 3D | Epoxy | XB5170 | 2400 | 130 | 9 |
| DTM | Nylon-11 | LN4000 | 5200 | 200 | 32 |
| Stratasys | ABS |  | 5000 | 360 | 50 |
| ACR | PEEK | 450 FC | 36374 | 1195 | 3 |

High pressure fused deposition was not successful at forming melt processible thermosets. Acetylene terminated resins and phenylethynyl resins were very sensitive to residence time above initiation temperature and would cure in the nozzle.

The high pressure piston extruder head is very versatile and can be used to form a number of important materials systems including both engineering polymers and ceramics. The most important capability of the head is that very high melt viscosity materials can be free formed. However, there are other advantages in using a feed rod system. One is that only a small quantity of the raw material is required which makes the system ideal for materials screening. A second advantage is that it is easy to switch between materials. The main disadvantage is for large parts where many feed rods must be manually loaded. Feed rod loading is easy to perform and does not produce defects in the parts.

Various changes to the method and apparatus are therefore possible without departing from the spirit and scope of the invention. Thus, the invention is to be limited only by the claims and equivalents thereof.

What is claimed is:

1. An apparatus for thermal extrusion of a polymeric material to manufacture prototype mechanical elements from said polymeric material, said apparatus used for deposition of a liquefied ribbon of said polymeric material in patterned layers which solidify to form a three-dimensional prototype element, said apparatus comprising in combination:

a) a mounting frame, said mounting frame including a mounting plate with a movable platen movable in the x and y directions;

b) said mounting frame further including an extrusion cylinder, said extrusion cylinder comprising a cylindrical housing having a uniform diameter cylindrical through passage, a head member having a uniform diameter bore connected with a reduced diameter, integral tip opening, said head member attached by a clamp to one end of the cylindrical housing to align the bore with the through passage, said bore and through passage having an equal diameter, said head member including a circumferential heater to liquefy contents of the head member;

c) a reciprocal piston slidably positioned in the cylindrical housing; and d) a piston actuator for driving the piston into the through passage to eject material through the tip opening of the head member.

2. The apparatus of claim 1 in combination with a cylinder of polymeric material taken from a group consisting of polyaryletherketone, polyurethane, polycarbonate and polymethyl methacrylate.

3. A method for forming prototype mechanical elements from polymer materials on a platform comprising the steps of:

a) positioning a cylindrical rod of said polymer material in a cylindrical housing having a through passage with a diameter substantially equal to the diameter of the cylindrical slug, said housing being connected with and attached to a discharge head member having a uniform diameter bore connecting with the through passage, a discharge tip, a reduced diameter discharge opening in the tip, and a circumferential heater to liquify the material in the bore;

b) compressing the material in the housing with a piston while simultaneously liquefying the material in the head member to thereby discharge a ribbon of material from the tip;

c) transporting the platform in the x and y directions while discharging material thereon to form the cross sectional shape of the element; and d) transporting the housing and head member in the z direction simultaneously to form the element in elevation.

4. The method of claim 3 wherein the polymer material is from the group consisting of polyanyletherketone, polyurethane, polycarbonate and polymethyl methacrylate.

5. The method of claim 4 wherein the rod is compressed at a pressure of about 500 to 700 psi and the temperature of the polymer in the head member is in the range of about 180° C. to 410° C.

* * * * *